United States Patent
Bitar et al.

(10) Patent No.: US 7,668,625 B2
(45) Date of Patent: Feb. 23, 2010

(54) LATERAL MANEUVERABILITY MAP FOR A VEHICLE AND METHOD OF OBTAINING IT

(75) Inventors: Elias Bitar, Toulouse (FR); Nicolas Marty, Castelginest (FR)

(73) Assignee: Thales (FR)

( * ) Notice: Subject to any disclaimer, the term of this patent is extended or adjusted under 35 U.S.C. 154(b) by 588 days.

(21) Appl. No.: 10/583,144

(22) PCT Filed: Nov. 30, 2004

(86) PCT No.: PCT/EP2004/053175

§ 371 (c)(1),
(2), (4) Date: Jun. 16, 2006

(87) PCT Pub. No.: WO2005/069255

PCT Pub. Date: Jul. 28, 2005

(65) Prior Publication Data

US 2007/0150117 A1   Jun. 28, 2007

(30) Foreign Application Priority Data

Dec. 19, 2003  (FR) .................................. 03 15020

(51) Int. Cl.
G05D 1/00 (2006.01)
(52) U.S. Cl. .............................................. 701/1; 701/3
(58) Field of Classification Search ............... 701/1, 701/3, 14, 300–302; 342/29; 340/945, 961, 340/425.5, 435–436
See application file for complete search history.

(56) References Cited

U.S. PATENT DOCUMENTS 5,839,080 A   11/1998   Muller et al.
7,337,043 B2*  2/2008   Bull ............................. 701/1

FOREIGN PATENT DOCUMENTS

FR   03/11320   9/2003
FR   2860292    12/2005

OTHER PUBLICATIONS

Stiles P et al: "Route planning" IEEE Oct. 14, 1991 pp. 420-425.
Borgefors G. : "Distance Tranformations in Digital Images" Computer Vision Graphics and Image Processing, Academic Press, Duluth, MA pp. 344-371.
Stiles, P. et al. "Route Planing", IEEE, Oct. 14, 1991, pp. 420-425, XP010093730.
Borgefors, G. "Distance Transformations in Digital Images", Computer Vision Graphics and Image Processing, Academic Press, Duluth, MA, US, vol. 34, 1986, pp. 344-371, XP000654507.

* cited by examiner

Primary Examiner—Yonel Beaulieu
(74) Attorney, Agent, or Firm—Lowe Hauptman Ham & Berner, LLP

(57) ABSTRACT

This lateral maneuverability map shows the area of movement of a vehicle with the contours of the regions of complete freedom of lateral movement. It is generated from a distance map listing the distances of the points of its regions that can be negotiated by the vehicle to the regions to be circumvented. It may show the area of movement of the vehicle in the form of a subdivision into at least three types of region, namely a first type corresponding to regions to be circumvented, a second type corresponding to bands surrounding the regions to be circumvented and having the width of a maneuvering space arbitrarily considered as necessary for free lateral movement of the vehicle, and a third type of region corresponding to regions of free lateral movement. In the case of an aircraft, said map may be superimposed on the map of a TAWS system in order to specify to the pilot if he has complete freedom of lateral movement or not.

17 Claims, 4 Drawing Sheets

| 21 | 16 | 16 | 15 | 15 | 15 | 16 | 16 | 18 | 22 | 27 | 33 |
|----|----|----|----|----|----|----|----|----|----|----|----|
| 18 | 14 | 11 | 10 | 10 | 10 | 11 | 14 | 18 | 22 | 27 | 28 |
| 14 | 11 | 7  | 5  | 5  | 5  | 7  | 11 | 16 | 19 | 21 | 25 |
| 11 | 7  | 5  | 0  | 0  | 0  | 5  | 10 | 15 | 14 | 18 | 22 |
| 10 | 5  | 0  | 0  | 0  | 0  | 5  | 5  | 7  | 11 | 16 | 21 |
| 10 | 5  | 0  | 0  | 0  | 0  | 0  | 0  | 5  | 10 | 15 | 20 |
| 11 | 7  | 5  | 5  | 5  | 5  | 5  | 5  | 7  | 11 | 16 | 21 |
| 14 | 11 | 10 | 10 | 10 | 10 | 10 | 10 | 11 | 14 | 18 | 22 |
| 18 | 16 | 15 | 15 | 15 | 15 | 15 | 15 | 16 | 18 | 21 | 25 |

LATERAL MANEUVERABILITY MAP FOR A VEHICLE AND METHOD OF OBTAINING IT

CROSS-REFERENCE TO RELATED APPLICATIONS

The present Application is based on International Application No. PCT/EP2004/053175, filed on Nov. 30, 2004, which in turn corresponds to FR 03/15020 filed on Dec. 19, 2003, and priority is hereby claimed under 35 USC §119 based on these applications. Each of these applications are hereby incorporated by reference in their entirety into the present application.

BACKGROUND OF THE INVENTION

1. Field of the Invention

The invention relates to a navigational aid for a vehicle subject to maneuverability and path constraints, such as an aircraft flying over territory having inhibited areas of overflight below a certain floor or reliefs and obstacles to be circumvented as they are close to or above its flight altitude.

2. Description of the Related Art

Various systems have been developed for warning the crew of an aircraft of a risk of collision with the ground. Some of these, such as terrain awareness and warning systems (TAWS), make a short-term trajectory prediction for the aircraft on the basis of flight information (position, bearing, orientation and amplitude of the velocity vector) that are provided by the onboard equipment, place it in a situation relative to a map of the overflown region extracted from a database of elevations of the terrain accessible on board and issue alarms to the crew of the aircraft each time that the short-term predicted trajectory would come into collision with the ground. These TAWS systems compliment their alarms with rudimentary recommendations of the kind "terrain ahead, pull up". Some of these systems also give information about the level of collision risk that the reliefs and obstacles around the aircraft incur in the form of map which presents the reliefs or obstacles of the overflown terrain as strata of different colors depending on the magnitude of the risk incurred.

In this field, the Applicant has proposed, in French patent application filed on Sep. 26, 2003, under No. 03/11320, a navigational aid map representing the area of movement of a vehicle subdivided into regions shown in false colors and bounded according to the possibility of the vehicle to negotiate them and the time that the vehicle would take to reach them when they are negotiable, for example red in the case of nonnegotiable obstacles, yellow for remote accessible regions and green for close accessible regions. This navigation map is generated by means of a distance map constructed from a database of elevations of the terrain and of portions of the relief that are likened to obstacles to be circumvented. The distance map lists the curvilinear distances separating the instantaneous position of the vehicle relative to the various accessible points in the area of movement that is mapped, considering only the paths that avoid the obstacles to be circumvented. These distances are estimated by means of a propagation distance transform.

However, the known navigational aid maps indicating the nonnegotiable parts or parts that are prohibited from being negotiated as obstacles to be circumvented, give no information about the extent of the areas adjacent to the obstacles in which the vehicle has little freedom of movement in the short term owing to the proximity of an obstacle to be circumvented. However, this information is beneficial, most particularly in the case of an aircraft, as it may serve to indicate moments when flying becomes more tricky and when the crew must increase its attention.

SUMMARY OF THE INVENTION

It is an object of the invention to provide a vehicle with information about the extent of its freedom of lateral movement at the present instant and in the short term and medium term.

The subject of the invention is a lateral maneuverability map for a vehicle, representing, within an area of movement, the contours of regions of complete freedom of lateral movement for the vehicle, taking into account the maneuvering capabilities of the vehicle and the need for the vehicle to avoid regions arbitrarily considered as nonnegotiable.

Advantageously, the lateral maneuverability map is added, as a transparent overlay, to a map delivered by a navigation system.

Advantageously, when the vehicle is an aircraft, the lateral maneuverability map is added, as a transparent overlay, to a map delivered by a TAWS system for preventing the risk of collision with the ground.

Advantageously, the lateral maneuverability map is added, as a transparent overlay, to a map delivered by a navigation system, the regions of complete freedom of lateral movement appearing by semitransparent masking.

Advantageously, the lateral maneuverability map is added as a transparent overlay, to a map delivered by a navigation system, the regions of complete freedom of lateral movement appearing by masking of textures.

Advantageously, the lateral maneuverability map for a vehicle represents, within an area of movement, various types of regions distinguished from each other by the possibility of the vehicle to negotiate them or not and, for the types of negotiable regions by the extent of the lateral maneuvering freedom left to the vehicle owing to its maneuvering capabilities and to the need for it to avoid the nonnegotiable areas.

Advantageously, the regions represented are at least of three separate types: a first type corresponding to the nonnegotiable regions, a second type corresponding to bands surrounding the nonnegotiable regions and having the width of a maneuver space considered as necessary for a free lateral movement of the vehicle, and a third type corresponding to regions of free lateral movement.

Advantageously, the various types of region are represented in false colors.

Advantageously, the various types of region are represented by different textures.

Advantageously, at least one of the second and third types of region is represented with iso-distance lines with respect to the borders of the regions to be circumvented.

Advantageously, at least one of the second and third types of region is represented with color gradations representative of distances from the borders of the regions to be circumvented.

Advantageously, when the lateral maneuverability map for navigation is intended for an aircraft, the width of the bands constituting the second type of region takes into account the instantaneous performance of the aircraft.

Advantageously, when the lateral maneuverability map is intended for an aircraft, the width of the bands constituting the second type of region takes into account the flight envelope of the aircraft.

Advantageously, when the navigation map is intended for an aircraft, the width Sd of the bands constituting the second type of region is determined by applying the equation:

$$Sd = \text{HLD\_M} + \text{HLD\_T} + \sqrt{\left(\frac{\text{HLD\_L}}{2}\right)^2 + \text{HLD\_T}^2}$$

HLD_M being a safety margin;

HLD_L being a configuration datum defined in terms of flight time or distance traveled over the ground;

HLD_T being a turning radius corresponding to the equation:

$$\text{HLD\_T} = \frac{GS^2}{g \times \tan(\text{HLD\_B})}$$

g being the gravitational acceleration;

GS being the ground speed of the aircraft; and

HLD_B being the maximum value permitted for the roll angle adopted by the aircraft when turning.

The subject of the invention is also a method of generating a lateral maneuverability map covering an area of movement for a vehicle, comprising negotiable regions and nonnegotiable regions, which is noteworthy in that it comprises the following steps:

generation, from knowledge of the regions considered as nonnegotiable and to be circumvented, and of elements of a database of elevations of the terrain covering the area of movement, of a distance map covering the area of movement of the vehicle to be mapped and giving the distances from its external points to the regions to be circumvented, relative to the borders of the regions arbitrarily considered as nonnegotiable;

assembly as regions of complete freedom of lateral movement, of connex points, the distances from which, provided by the distance map, are greater than a threshold arbitrarily considered as necessary for free lateral movement of the vehicle; and representation of the contours of these regions of complete freedom of lateral movement.

The subject of the invention is also a method of generating a lateral maneuverability map covering an area of movement for a vehicle comprising negotiable regions and nonnegotiable regions, which is noteworthy in that it comprises the following steps:

generation, from knowledge of the regions considered as nonnegotiable and to be circumvented, and of elements of a database of elevations of the terrain covering the area of movement, of a distance map covering the area of movement of the vehicle to be mapped and giving the distances from its external points to the regions to be circumvented, relative to the borders of the regions arbitrarily considered as nonnegotiable;

considering the nonnegotiable regions as a first type of region, assembly in regions of a second type, of the connex points whose distances provided by the distance map are less than a threshold arbitrarily considered as necessary for free lateral movement of the vehicle, and in regions of a third type of the connex points whose distances provided by the distance map are greater than said threshold; and representation of the area of movement in the form of a subdivision into these three types of region.

Advantageously, the distance map used in the method for obtaining the lateral maneuverability map is obtained by means of a chamfer distance transform.

Advantageously, in the method for obtaining the lateral maneuverability map, the distances mentioned in the distance map are used to plot the lines of iso-distance from the borders of the regions to be circumvented.

BRIEF DESCRIPTION OF THE DRAWINGS

Other features and advantages of the invention will become apparent from the description below of one embodiment given by way of example. This description is given in conjunction with the drawing in which:

FIG. 4 shows a second step in the generation of a lateral maneuverability map according to the invention, consisting in estimating the distances of the cells of the accessible regions to the boundaries of the inaccessible regions;

FIG. 5 shows one way of estimating the width of the minimum space necessary for free lateral movement of an aircraft;

The generation of the lateral maneuverability map covering an area of movement is based on:

a database of elevations of the terrain covering the area of movement and containing maximum altitude values, corresponding to a subdivision of the area of movement into rectangular cells;

location of the rectangular cells resulting from the adopted subdivision of the area of movement in the database of terrain elevations, which cells form part of regions to be circumvented for various reasons, namely relief considered as nonnegotiable, prohibited area of entry, etc.;

the parameters of the actual movement of the vehicle—in the case of an aircraft, these are its velocity vector, its position, its altitude, its attitude, etc.; and the theoretical parameters of the envelope of the minimum clearance volume around the vehicle necessary for its free lateral movement.

DETAILED DESCRIPTION OF THE EMBODIMENTS

Figure 1:
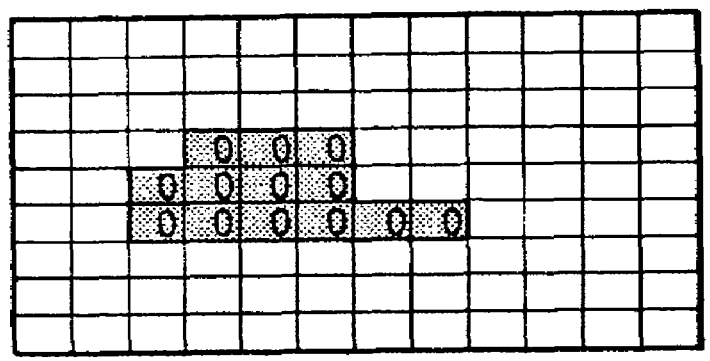
FIG. 1 represents a first step in the generation of a lateral maneuverability map according to the invention, consisting in marking those cells of the regions that are considered as inaccessible with zeroes.

As shown in FIG. 1, the generation of the lateral maneuverability map starts by the construction of a distance map initiated by the authoritative assignment of a zero-distance estimate to the cells of the mapped area resulting from the adopted subdivision for the database of terrain elevations, which cells belong to those parts of the area of movement that are considered as having to be circumvented.

The selection of these cells results from various considerations, which will not be explained in detail here as they do not form part of the invention. For an aircraft, these may be cells corresponding to reliefs close to or above the altitude setpoint of its flight plan or to a prediction of the altitude of the aircraft in the short or medium term based on its actual flight parameters. They may also be totally prohibited areas of overflight or below a minimum altitude above the altitude setpoint of the aircraft's flight plan or a prediction of its altitude in the short or medium term.

Once the cells of the parts to be circumvented, which are authoritatively assigned a zero-distance estimate, the construction of the lateral maneuverability map continues with estimates of the distances from the other cells of the mapped area relative to the edges of the parts to be circumvented, that is to say estimates of the lengths of the shortest paths running from the cells in question to the closest part to be circumvented. Advantageously, the estimates are made using a propagation distance transform, also known as a chamfer distance transform.

Chamfer distance transforms initially appeared for image analysis in order to estimate distances between objects. Gunilla Borgefors describes examples of these in her article entitled "Distance Transformation in Digital Images" published in the Journal: Computer Vision, Graphics and Image Processing, Vol. 34, pp. 344-378 in February 1986.

The distance between two points on a surface is the minimum length of all the possible paths on the surface starting from one of the points and ending at the other. In an image formed from pixels distributed in a regular mesh of rows, columns and diagonals, a chamfer distance transform estimates the distance of one pixel called the "target" pixel from a pixel called the "source" pixel by progressively constructing, starting from the pixel source, the shortest possible path along the mesh of pixels and ending at the target pixel, and by employing distances found for the pixels of the image that have already been analyzed and using a table called a chamfer mask that lists the distances between a pixel and its nearest neighbors.

To estimate the distance between a target pixel and the edge of an object, the object is considered as being formed from a set of source pixels and the shortest of the estimated distances between the target pixel and the various source pixels of the object is adopted as the distance estimate.

Figure 2:
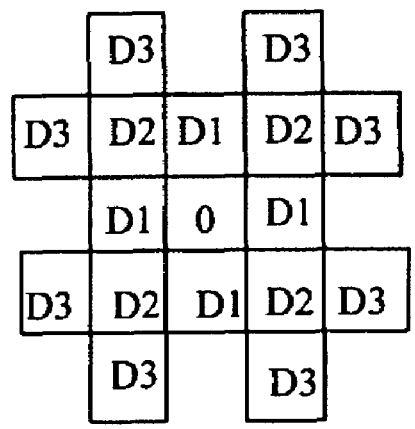
FIG. 2 shows an example of a chamfer mask that can be employed by means of a propagation distance transform used for the distance estimates.

As shown in FIG. 2, a chamfer mask takes the form of a table with an arrangement of boxes reproducing the pattern of a pixel surrounded by its nearest neighbors. At the center of the pattern, a box assigned the value 0 identifies the pixel taken as the origin of the distances listed in the table. Clustered around this central box are peripheral boxes filled with nonzero proximity distance values, said boxes repeating the arrangement of the pixels in the neighborhood of a pixel assumed to occupy the central box. The proximity distance value appearing in a peripheral box is that of the distance separating a pixel occupying the position of the peripheral box in question from a pixel occupying the position of the central box. It should be noted that the proximity distance values are distributed in concentric circles. In a first circle, four boxes corresponding to the four pixels of the first rank, which are the closest to the pixel of the central box, either in the same row or in the same column, are assigned a proximity distance value D1. In a second circle, four boxes corresponding to the four pixels of second rank, which are pixels closest to the pixel of the central box lying on the diagonals, are assigned a proximity distance value D2. In a third circle, eight boxes corresponding to the eight pixels of third rank, which are closest to the pixel of the central box all remaining outside the row, column and diagonals that are occupied by the pixel of the central box, are assigned a proximity distance value D3.

The chamfer mask may cover a larger or smaller neighborhood of the pixel of the central box, listing the proximity distance values of a larger or smaller number of concentric circles of pixels in the neighborhood. It may be reduced to the first two circles formed by the pixels in the neighborhood of a pixel occupying the central box, as in the example of distance maps shown in FIGS. 4, 6, or they may be extended beyond the first three circles formed by the pixels in the neighborhood of the pixel of the central box. It is usual practice to stop at the first three circles, as in the case of the chamfer mask shown in FIG. 3.

The proximity distance values D1, D2 and D3, which correspond to Euclidian distances, are expressed on a scale whose multiplicative factor authorizes the use of integers at the cost of a certain approximation. Thus, G. Borgefors adopts a scale corresponding to a multiplicative factor of 3 or 5. In the case of a chamfer mask adopting the first two circles of proximity distance values, and therefore having dimensions 3×3, G. Borgefors gives the value 3 to the first proximity distance D1, which corresponds to an x-axis or y-axis step and also to the multiplicative scale factor, and gives the value 5 to the second proximity distance, which corresponds to the square root of the sum of the squares of the x-axis and y-axis steps, namely $\sqrt{x^2+y^2}$. In the case of a chamfer mask adopting the first three circles, therefore having dimensions of 5×5, she gives the value 5 to the distance D1 that corresponds to the multiplicative scale factor, the value 7, which is an approximation of $5\sqrt{2}$, to the distance D2 and value 11, which is an approximation of $5\sqrt{5}$, to the distance D3.

The progressive construction of the shortest possible path going to a target pixel, starting from a source pixel and following the mesh of the pixels, takes place by a regular scan of the pixels of the image by means of the chamfer mask. Initially, the pixels of the image are assigned an infinite distance value—in fact a sufficiently high number in order to exceed all the measurable distance values in the image—with the exception of the source pixels, which are assigned a zero distance value. Next, the initial distance values assigned to the target points are updated as the image is scanned by the chamfer mask, an update consisting in replacing the distance value assigned to a target point with a new, lower value resulting from a distance estimate made on the occasion of a new application of the chamfer mask to the target point in question.

A distance estimation, by applying the chamfer mask to a target pixel, consists in listing all the paths going from this target pixel to the various source pixels and passing through a pixel in the neighborhood of the target pixel, the distance of which has already been estimated during the same scan, in searching among the listing paths for the shortest path or paths, and in adopting the length of the shortest path or paths as the distance estimate. This is accomplished by placing the target pixel, the distance of which, in the central box of the chamfer mask, it is desired to estimate, by selecting the peripheral boxes of the chamfer mask that correspond to pixels in the neighborhood, the distance of which has just been updated, by computing the lengths of the shortest paths connecting the target pixel to be updated to the closest source pixel passing through one of the selected pixels in the neighborhood, by adding the distance value assigned to the pixel in the neighborhood in question and adding the proximity distance value given by the chamfer mask and in adopting as distance estimate, the minimum of the path length values obtained and of the old distance value assigned to the pixel over the course of the analysis.

The order in which the pixels of the image are scanned has an influence on the reliability of the distance estimates and of their updating since the paths taken into account depend thereon. In fact, the order is subject to a regularity constraint which means that, if the pixels of the image are listed in lexicographic order (pixels classified in an order increasing row by row starting from the top of the image and progressing towards the bottom of the image, and from left to right within one row), and if a pixel p has been analyzed before a pixel q, then a pixel p+q must be analyzed before the pixel q+x. The lexicographic order, the reverse lexicographic order (scanning of the pixels of the image row by row from the bottom up and, within a row, from right to left), the transposed lexicographic order (scanning of the pixels of the image column by column from left to right and, within a column, from the top down) and the reverse transposed lexicographic order (scanning of the pixels by columns from right to left and, within a column, from the bottom up) satisfy this regularity condition and, more generally, all scans in which the rows and columns are scanned from right to left or from left to right. G. Borgefors recommends scanning the pixels of an image twice, once in lexicographic order and once in reverse lexicographic order.

Figure 3A:
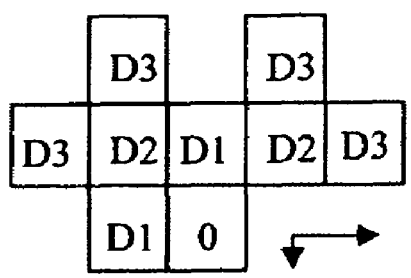
FIGS. 3a and 3b show the cells of the chamfer mask illustrated in FIG. 2, which are used in a scan pass in lexicographic order and in a scan pass in reverse lexicographic order.

FIG. 3a shows, in the case of a scan pass in lexicographic order going from the upper left corner to the bottom right corner of the image, the boxes of the chamfer mask of FIG. 1 that are used to list the paths going from a target pixel placed in the central box (the box indexed by zero) to the source pixel passing through a pixel in the neighborhood, the distance of which has already been estimated during the same scan. There are eight of these boxes, placed in the left upper part of the chamfer mask. There are therefore eight paths listed for the search for the shortest, the length of which is taken as the distance estimate.

Figure 3B:
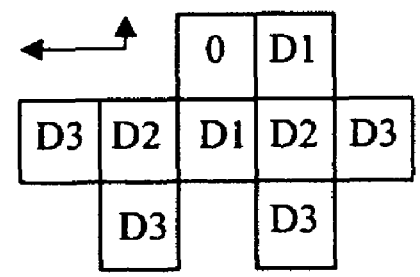

FIG. 3b shows, in the case of a scan pass in reverse lexicographic order going from the right lower corner to the left upper corner of the image, the boxes of the chamfer mask of FIG. 1 that are used for listing the paths going from a target pixel placed in the central box (the box indexed by zero) to the source pixel passing through a pixel in the neighborhood, the distance of which has already been estimated during the same scan. These boxes are complementary to the boxes of FIG. 2a. There are also eight of them, but these are based in the right lower part of the chamfer mask. Again, there are therefore eight paths listed for the search for the shortest, the length of which is taken as the estimate of the distance.

FIG. 4 illustrates the distance map obtained in the second step of generating the lateral maneuverability map, after application in FIG. 1 of the chamfer distance transform using the 5×5 chamfer mask of FIG. 3.

During the next step, illustrated in FIG. 5, the generation of the lateral maneuverability map, the distance estimates contained in the cells of the mapped area corresponding to the adopted subdivision for the database of terrain elevations are used to delimit the various regions represented. The cells assigned a zero distance estimate, which correspond, by assumption, to those parts of the area of movement which are considered as having to be circumvented, are represented in a specific manner, for example colored red, or, as in FIG. 5, with a closely-spaced hatched texture, meaning that these cells constitute prohibited regions of access. The cells assigned distance estimates that are nonzero but are smaller than a certain threshold below which it is considered that the proximity of a prohibited region of access limits in the short or medium term, the freedom of lateral movement of the vehicle, which threshold is taken here to be 17 in the scale adopted, are represented, for example by being colored yellow or, as in FIG. 5, with a checkerboard texture or a less closely-spaced hatched texture than that covering the cells assigned zero distance estimates. They form bands of a certain width surrounding the prohibited access regions in which it is considered that the vehicle has its freedom of lateral movement in the short term limited by the proximity of one or more prohibited regions of access. The other cells assigned distance estimates above the threshold in question are represented for example by being colored green, meaning that they constitute regions in which the vehicle obtains complete freedom of lateral movement in the short term or else, as in FIG. 5, uncolored or with no texture. Of course, the representation of the region formed by the cells assigned distance estimates below the threshold, like that of the region formed from the cells assigned distance estimates above the threshold, may be more elaborate, for example with color gradations corresponding to the variation in the distance estimate or with iso-distance lines.

The distance threshold used to indicate a restriction in the short or medium term on the freedom of lateral movement of a vehicle depends on the maneuverability of the vehicle. In the case of an aircraft, the maneuverability may be defined on the basis of:

aeronautical procedures;
required safety margins;
current flight parameters of the aircraft;
flight conditions defined by the flight envelope of the aircraft.

In particular, it may be accepted that an aircraft obtains its freedom of lateral movement in the short or medium term if it is capable of describing a racetrack holding pattern, on one side or the other of its current trajectory, without modifying its current speed or being subjected when turning to mechanical constraints that exceed a certain tolerance threshold expressed by a limiting roll angle. In this situation, the distance threshold to be respected is the radius of the circle circumscribing the two possible trajectories for the racetrack holding pattern, increased by a safety margin.

Figure 6:
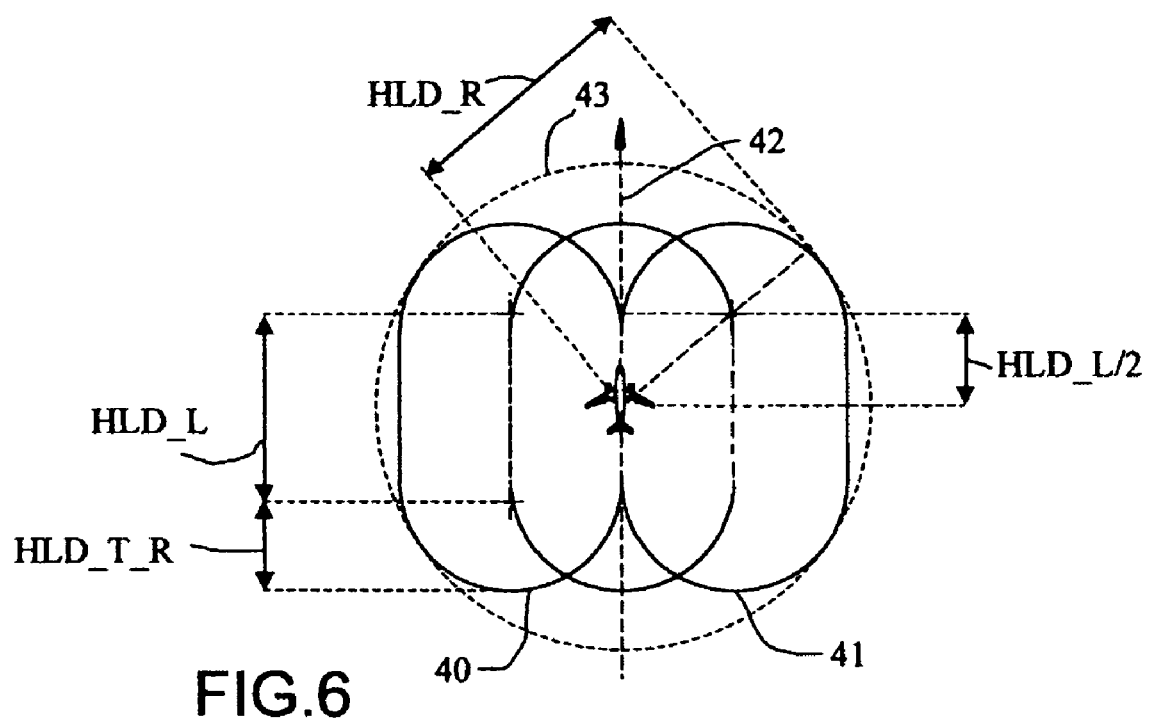
FIG. 6 shows a third step in the generation of a lateral maneuverability map according to the invention consisting in delimiting, around the inaccessible regions, by thresholding of the estimated distances, bands surrounding the inaccessible regions of insufficient width for free movement of the vehicle, the remaining portions of the map being considered as belonging to regions of free lateral movement for the vehicle.

As shown in FIG. 6, the two possible trajectories 40, 41 for the racetrack holding pattern form two lobes tangential to the current trajectory 42 of the aircraft. Each of them comprises two lengths HLD_L joined together by two half-turns of radius HLD_T.

The value of the length HLD_L is a configuration datum defined in terms of flight time or distance traveled over the ground. The value of the radius HLD_T of the half-turns, assumed to be performed flat, with a constant ground speed GS and constant roll angle HLD_B, is given by the equation:

$$\text{HLD\_T} = \frac{GS^2}{g \times \tan(\text{HLD\_B})}$$

the ground speed GS being a datum provided by the aircraft's equipment, HLD_B being a configuration datum calculated on the basis of the theoretical performance of the aircraft, and g being the gravitational acceleration.

The value of the radius HLD_R of the circle 43 circumscribing the two possible trajectories 40, 41 for the racetrack holding pattern is given by the equation:

$$\text{HLD\_R} = \text{HLD\_T} + \sqrt{\left(\frac{\text{HLD\_L}}{2}\right)^2 + \text{HLD\_T}^2}$$

Finally, the distance threshold, Sd adopted for the width of the bands surrounding the obstacles to be circumvented takes the value:

$$Sd = \text{HLD\_M} + \text{HLD\_T} + \sqrt{\left(\frac{\text{HLD\_L}}{2}\right)^2 + \text{HLD\_T}^2}$$

HLD_M being an additional safety margin with respect to the radius HLD_R of the circle circumscribing the two possible trajectories of the racetrack holding pattern.

Figure 7:
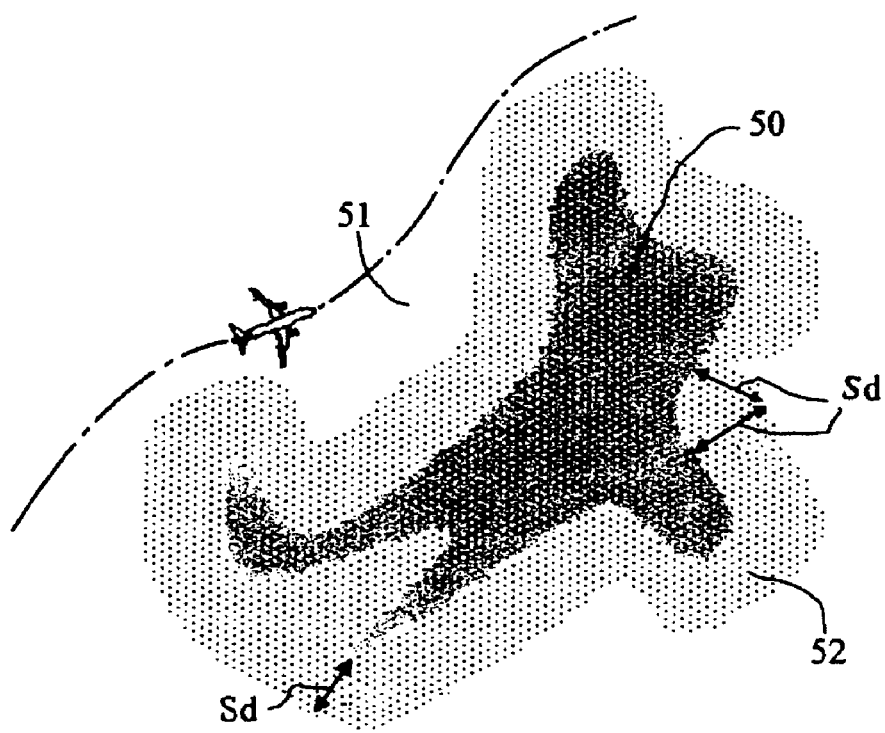
FIG. 7 shows an example of a lateral maneuverability map according to the invention.

FIG. 7 shows how the area of movement finally appears in the lateral maneuverability map. Each region 50 of prohibited access is isolated from the regions 51 of free lateral movement by a separating band 52 of width Sd that depends on the performance and the ground speed of the aircraft and also on the turning constraints. The prohibited access regions are represented in one manner, for example by means of a red color, the separating bands in another manner, for example by means of a yellow color, and the regions of free lateral movement in another manner, for example by means of a green color, so that they are easily distinguished from one another. As indicated above, the lateral maneuverability map may be more detailed and include lines of iso-distance from the borders of the prohibited access regions. It may also include color gradations, again representative of the distances from the prohibited access regions.

In another, again very beneficial, use, the lateral maneuverability map is reduced to its simplest expression, that is to say to the inventory of regions of free lateral movement and the placing of a transparent overlay on top of an existing map of the same area, drawn by a navigation system or by a TAWS system for protection against the risk of collision with the ground. Its method of formation is therefore simplified since in this case only the contours of the regions of entire freedom of lateral movement are extracted from the distance map, distinguishing the connex points of the negotiable regions, the distances of which are above the threshold arbitrarily considered as necessary for free lateral movement of the vehicle. In this other use, the information about the contours of the regions of free lateral movement provided by the lateral maneuverability map is added to the existing map by giving the areas of free movement a specific pigmentation that brings out these regions without concealing the information already present, for example by means of a white semitransparent mask.

The lateral maneuverability map that has just been proposed has the advantage of taking into account a lateral safety margin with respect to the edges of the regions considered as prohibited access regions, and to do so independently of the procedure for determining the prohibited access regions. In the case of an aircraft, it allows a lateral safety margin to be added around the reliefs considered as being dangerous by the existing terrain anticollision systems. Again in the case of an aircraft, this map also has the advantage of presenting a lateral safety margin that takes into account the instantaneous performance of the aircraft and of the flight conditions defined by its flight envelope.

Figure 8:
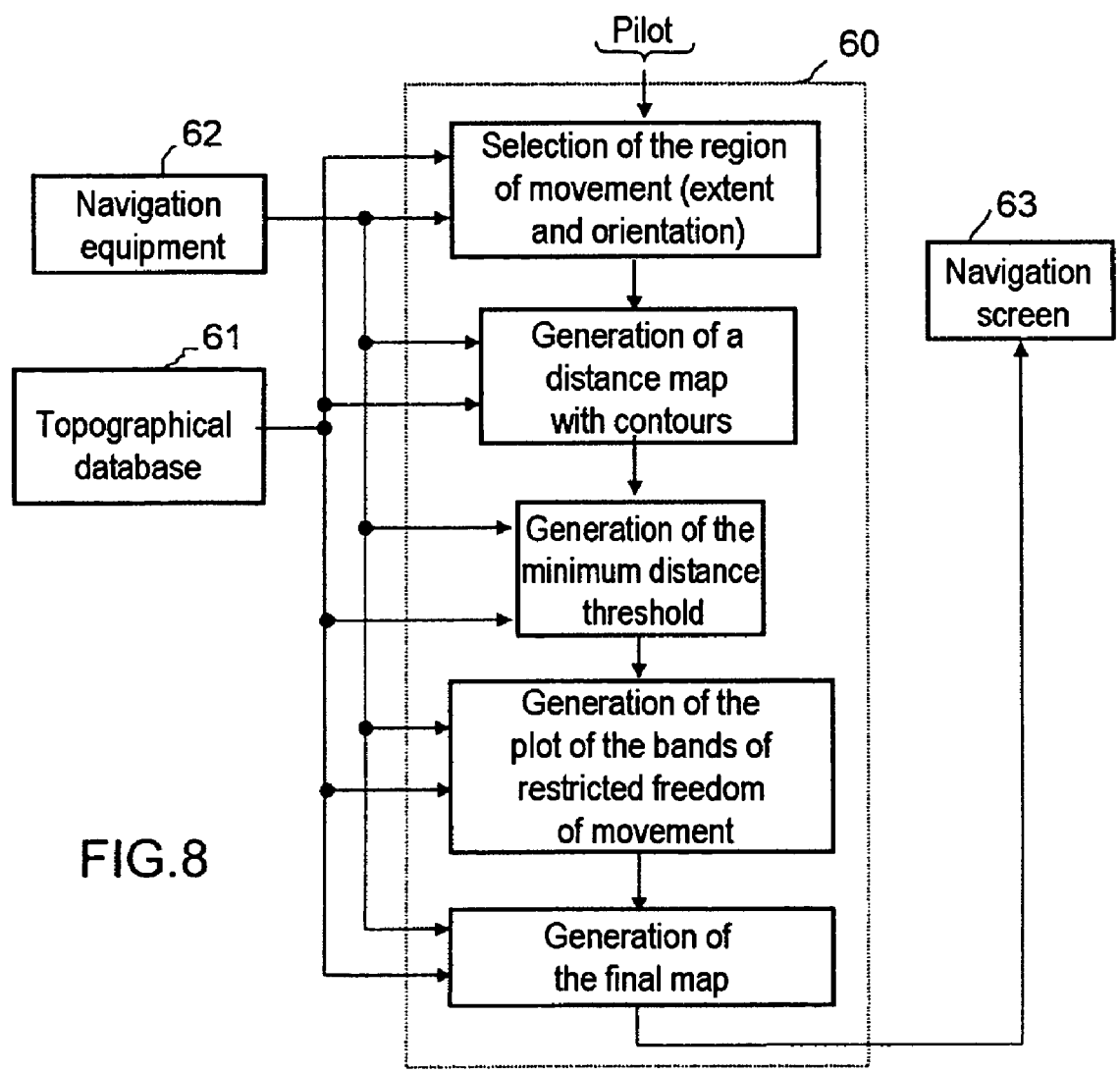
FIG. 8 shows a flowchart for aircraft navigation aid displaying a lateral maneuverability map according to the invention.

FIG. 8 shows an aircraft navigation aid that displays a lateral maneuverability map. This is made up essentially of a computer 60 linked to a database 61 of terrain elevations and prohibited areas of overflight, and to the aircraft's navigation equipment 62 and to a visual display device 63. The database 61 of terrain elevations and prohibited areas may be onboard the aircraft, as shown, or placed on the ground and accessible to the aircraft by radio transmission. The computer 60 may be a specific computer for generating and displaying a navigation map, optionally listing the risks of collision with the ground that the reliefs and obstacles of the overflown ground incur, or a computer shared with other tasks such as the flight management or the automatic pilot. It receives, from the aircraft's navigation equipment 62, the main flight parameters, including the position of the aircraft in terms of latitude, longitude and altitude, and the direction and magnitude of its velocity vector, which allow it to determine, at each instance, the position, relative to the surface of the Earth, the orientation and the dimensions of an area of movement to be displayed. When in possession of the orientation and the dimensions of the area of movement to be displayed, the computer extracts, from the database 61 of terrain elevations and prohibited areas, a locating grid that maps the selected area of movement and places the contours of the prohibited areas of overflight on this grid. It then generates a distance map with respect to the contours of the prohibited areas of overflight. It calculates a minimum distance threshold necessary for free lateral movement of the aircraft and uses this threshold to delimit, in terms of width, bands surrounding the prohibited areas of overflight, said bands being considered as too close to the prohibited areas of overflight to allow free lateral movement. It then displays a map of the area of movement on the visual display device 63, said map showing distinctly the prohibited areas of overflight, the bands surrounding them, and the other regions that are free movement regions.

The invention claimed is:

1. A lateral maneuverability map for a vehicle that represents, within an area of movement:
   contours of nonnegotiable regions to be circumvented,
   bands surrounding nonnegotiable regions and having the width of a maneuver space considered as necessary for a free lateral movement for the vehicle, taking into account the maneuvering capabilities of the vehicle and the need for the vehicle to avoid regions arbitrarily considered as nonnegotiable, and
   regions of complete freedom of lateral movement for the vehicle situated outside nonnegotiable regions and surrounding bands.

2. The map as claimed in claim 1, added, as a transparent overlay, to a map delivered by a navigation system.

3. The map as claimed in claim 1, designed for an aircraft provided with a system for preventing the risk of collision with the ground, which delivers a ground collision risk map, and added, as a transparent overlay, to the ground collision risk map.

4. The map as claimed in claim 2, added, as a transparent overlay, to a map delivered by a navigation system, the regions of complete freedom of lateral movement appearing by semitransparent masking.

5. The map as claimed in claim 2, added as a transparent overlay, to a map delivered by a navigation system, the regions of complete freedom of lateral movement appearing by masking using textures.

6. The map as claimed in claim 1, wherein the different regions and surrounding bands are represented in false colors.

7. The map as claimed in claim 1, wherein the different regions and surrounding bands are represented by different textures.

8. The map as claimed in claim 1, wherein the surrounding bands and regions of complete freedom of lateral movement are represented with iso-distance lines with respect to the borders of the nonnegotiable regions to be circumvented.

9. The map as claimed in claim 1, wherein the surrounding bands and regions of complete freedom of lateral movement are represented with color gradations representative of distances from the borders of the nonnegotiable regions to be circumvented.

10. The map as claimed in claim 1, wherein the width of the surrounding bands takes into account the instantaneous performance of the aircraft.

11. The map as claimed in claim 1, wherein the width of the surrounding bands takes into account the flight envelope of the aircraft.

12. The map as claimed in claim 1, wherein the width $Sd$ of the surrounding bands constituting the second type of region is determined by applying the equation:

$$Sd = \text{HLD\_M} + \text{HLD\_T} + \sqrt{\left(\frac{\text{HLD\_L}}{2}\right)^2 + \text{HLD\_T}^2}$$

HLD_M being a safety margin;
HLD_L being a configuration datum defined in terms of flight time or distance traveled over the ground;
HLD_T being a turning radius corresponding to the equation:

$$\text{HLD\_T} = \frac{GS^2}{g \times \tan(\text{HLD\_B})}$$

g being the gravitational acceleration;
GS being the ground speed of the aircraft; and
HLD_B being the maximum value permitted for the roll angle adopted by the aircraft when turning.

13. A method for obtaining a map, comprising:
generation, from knowledge of the regions considered as nonnegotiable and to be circumvented, and of elements of a database of elevations of the terrain covering the area of movement, of a distance map covering the area of movement of the vehicle to be mapped and giving the distances from its external points to the regions to be circumvented, relative to the borders of the regions to be circumvented;
assembly as regions of complete freedom of lateral movement, of connex points, the distances from which, provided by the distance map, are greater than a threshold arbitrarily considered as necessary for free lateral movement of the vehicle; and
representation of the contours of these regions of complete freedom of lateral movement.

14. A method for obtaining a map comprising:
generation, from knowledge of the regions considered as nonnegotiable and to be circumvented, and of elements of a database of elevations of the terrain covering the area of movement, of a distance map covering the area of movement of the vehicle to be mapped and giving the distances from its external points to the regions to be circumvented, relative to the borders of the regions to be circumvented;
considering the regions to be circumvented as a first type of region,
assembly in regions of a second type, of the connex points whose distances provided by the distance map are less than a threshold arbitrarily considered as necessary for free lateral movement of the vehicle,
assembly in regions of a third type of the connex points whose distances provided by the distance map are greater than said threshold; and
representation of the area of movement in the form of a subdivision into these three types of region.

15. The method as claimed in claim 13, wherein the distance map is obtained by means of a chamfer distance transform.

16. The method as claimed in claim 13, wherein the distances mentioned in the distance map are used to plot the lines of iso-distance from the borders of the nonnegotiable regions.

17. A lateral maneuverability map for a vehicle that represents, within an area of movement, the contours of regions of complete freedom of lateral movement for the vehicle, taking into account the maneuvering capabilities of the vehicle and the need for the vehicle to avoid regions arbitrarily considered as nonnegotiable,
the map representing, within an area of movement, various types of regions distinguished from each other by the possibility of the vehicle to negotiate them or not and, for the types of negotiable regions by the extent of the lateral maneuvering freedom left to the vehicle owing to its maneuvering capabilities and to the need for it to avoid the nonnegotiable areas,
wherein the regions represented are at least of three separate types: a first type corresponding to the nonnegotiable regions, a second type corresponding to bands surrounding the nonnegotiable regions and having the width of a maneuver space considered as necessary for a free lateral movement of the vehicle, and a third type corresponding to regions of free movement, and
wherein the width Sd of the bands constituting the second type of region is determined by applying the equation:

$$Sd = \text{HLD\_M} + \text{HLD\_T} + \sqrt{\left(\frac{\text{HLD\_L}}{2}\right)^2 + \text{HLD\_T}^2}$$

HLD_M being a safety margin;
HLD_L being a configuration datum defined in terms of flight time or distance traveled over the ground;
HLD_T being a turning radius corresponding to the equation:

$$\text{HLD\_T} = \frac{GS^2}{g \times \tan(\text{HLD\_B})}$$

g being the gravitational acceleration;
GS being the ground speed of the aircraft; and
HLD_B being the maximum value permitted for the roll angle adopted by the aircraft when turning.

* * * * *